March 17, 1953  R. F. BRONSON  2,631,860
DOUBLE-ACTING COLLET
Filed Jan. 20, 1950

Inventor
Randolph F. Bronson

By *Clarence A. O'Brien and Harvey B. Jacobson*
Attorneys

UNITED STATES PATENT OFFICE

2,631,860

DOUBLE-ACTING COLLET

Randolph F. Bronson, Jamaica, N. Y.

Application January 20, 1950, Serial No. 139,660

1 Claim. (Cl. 279—56)

This invention relates to new and useful improvements and structural refinements in collets, and the principal object of the invention is to provide a device of the character herein described, which is primarily intended for use on work such as glass tubing, wherein compressed air is blown through the glass tube for forming, bending or otherwise shaping the latter, customarily in the presence of heat.

While a conventional collet or chuck is quite satisfactory for gripping the work of this nature, it usually occurs that compressed air blown through the tube escapes through spaces between the collet jaws at the outside of the tube and, as a result, the forming or shaping operation cannot be properly effected.

The instant invention eliminates this difficulty by providing what may be called a double acting collet, which not only grips the work, but also provides a closure around the work for the prevention of passage of air through the collet.

Some of the other advantages of the invention reside in its simplicity of construction, in its convenient and dependable operation, and in its adaptability to accommodate work of different diameters.

With the above more important objects and features in view and such other objects and features as may become apparent as this specification proceeds, the invention consists essentially of the construction and arrangement of parts as shown in the accompanying drawings, in which.

Like characters of reference are employed to designate like parts in the specification and throughout the several views.

Figure 1:
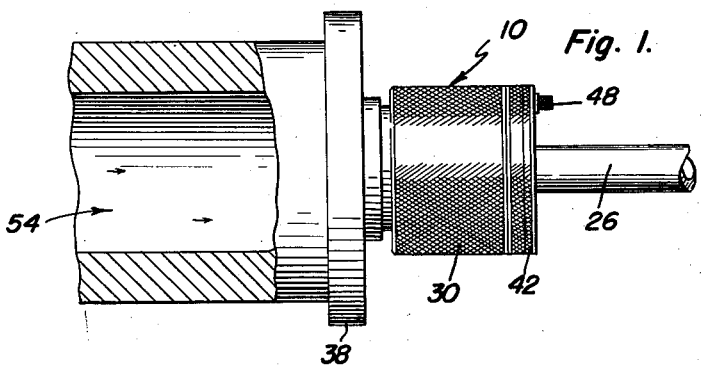
Figure 1 is a side elevational view of the invention showing a glass tube inserted therein.

Referring now to the accompanying drawing in detail, the invention consists of a double acting collet designated generally by the reference character 10, the same embodying in its construction a chuck 12 consisting of a set of co-acting jaws 14 which are movable radially toward and away from a common axis, namely, the center of a tubular or cylindrical piece of work, the adjacent jaws in the sets having opposing surfaces provided with blind bores constituting seats 16 for a compression spring 18 which is interposed between every two adjacent jaws for the purpose of urging the jaws outwardly.

Figure 3:
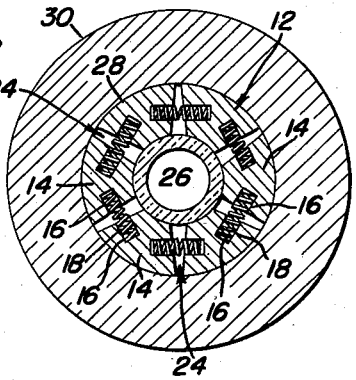
Figure 3 is a cross sectional view, taken substantially in the plane of the line 3—3 in Figure 2.
Figure 4:
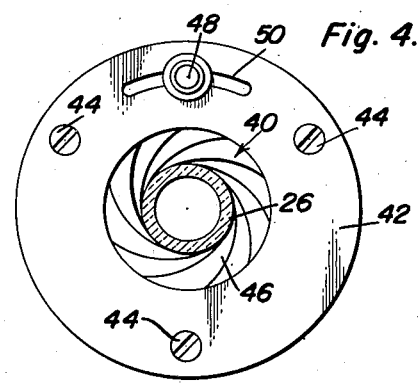
Figure 4 is a cross sectional view, taken substantially in the plane of the line 4—4 in Figure 2.
Figure 5:
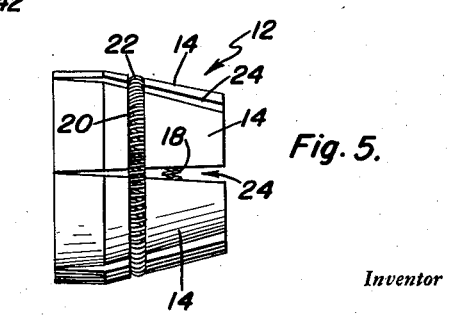
Figure 5 is a side elevational view of the chuck used in the invention.

However, outer surfaces of the jaws are recessed so as to afford an annular groove extending circumferentially around the chuck 12 as indicated at 20, while a resilient, annular element, such as an endless spring 22 is positioned in this groove for urging the jaws 14 together. As is best shown in Figures 3 and 5, spaces 24 exist between the adjacent jaws to facilitate inward and outward radial movement of the latter, which, of course, is necessary to enable the chuck to accommodate tubular or cylindrical work 26 of different diameters.

The entire chuck 12 is simply positioned within a substantially frusto-conical cavity 28 provided in a chuck actuating or adjusting sleeve 30, the latter being provided with a screw threaded portion 32 whereby it is rotatably mounted upon an adapter 34 secured as at 36 to a face plate 38. The outer surfaces of the chuck jaws 14 are beveled to engage the frusto-conical surface of the cavity 28 of the sleeve 30, and it will be apparent from the foregoing that by simply loosening or tightening the sleeve on the adapter 34, the chuck jaws 14 may be loosened or tightened on the work 26. As has been already stated, the compression springs 18 are sufficiently strong to normally expand the chuck when the sleeve 30 is loosened, the tightening of the chuck jaws being effected, of course, against the resiliency of the springs 18. On the other hand, the primary function of the spring 22 is to retain the chuck jaws together when the chuck is removed from the sleeve 30.

The essence of novelty of the invention resides in the combination of the chuck 12 with a diametrically adjustable closure designated generally by the reference character 40 which is disposed in a disc-shaped housing 42 secured as at 44 to the front end or face of the sleeve 30 for rotation therewith.

The closure 40 simply assumes the form of a conventional "iris diaphragm" such as commonly used in photographic cameras, including a plurality of overlapped, pivotally mounted blades 46 which may be overlapped to a lesser or greater extent so as to adjust the diameter of the opening at the center thereof. This adjustment is effected by a suitable hand knob 48 with which the closure 40 is equipped and which projects outwardly from the housing 42 through an arcuate slot 50, and it will be apparent from the foregoing that the adjustment of the closure 40 may be effected independently of the adjustment of the chuck 12 as facilitated by the sleeve 30.

Figure 2:
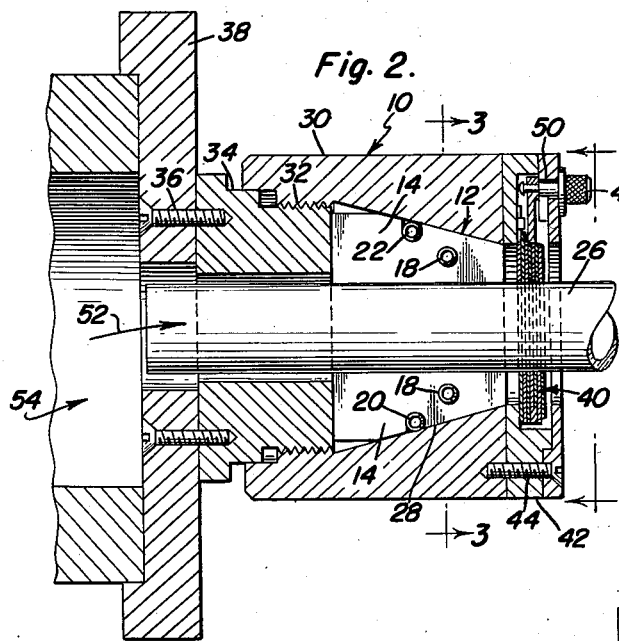
Figure 2 is a longitudinal sectional view of the subject shown in Figure 1.

Accordingly, when the invention is placed in use, a glass tube 26, or the like, is inserted in the collet and the sleeve 30 is tightened so as to clamp the chuck jaws 14 against the tube as shown in Figure 2, whereupon the closure 40 is adjusted by means of the knob 48 so that the blades 46 of the closure engage and completely surround the tube 26.

Compressed air may then be blown into the tube 26 as indicated at 52 in Figure 2 from a pressure chamber 54 located behind the face plate 38, and notwithstanding the aforementioned spaces 24 between the chuck jaws 14, escape of compressed air through the collet will be prevented by the closure 40 surrounding the work, the passage of air being possible only through the tube on which the forming or shaping operation is performed.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having thus described the invention, what is claimed as new is:

In a double acting collet, the combination of an adjustable gripping chuck including a set of coacting jaws having spaces therebetween and being adapted to accommodate work of different diameters, a chuck adjusting sleeve rotatable on the chuck and operatively engaging said jaws, a diametrically adjustable work engaging iris closure provided at one end of said sleeve and rotatable therewith, and means for adjusting said closure independently of the adjustment of said chuck, whereby passage of fluid through the spaces between said jaws may be prevented.

RANDOLPH F. BRONSON.

REFERENCES CITED

The following references are of record in the file of this patent:

UNITED STATES PATENTS

| Number | Name | Date |
|---|---|---|
| 351,871 | Lampert | Nov. 2, 1886 |
| 594,587 | Almond | Nov. 30, 1897 |
| 749,794 | Inman | Jan. 19, 1904 |
| 1,431,089 | Borkschot | Oct. 3, 1922 |
| 2,067,442 | Frisz | Jan. 12, 1937 |
| 2,364,682 | Ziegler | Dec. 12, 1944 |
| 2,468,465 | Sawyer | Apr. 26, 1949 |
| 2,478,102 | Hull et al. | Aug. 2, 1949 |
| 2,480,762 | Parker | Aug. 30, 1949 |